United States Patent
Kotake et al.

(10) Patent No.: US 7,103,232 B2
(45) Date of Patent: Sep. 5, 2006

(54) STORING AND PROCESSING PARTIAL IMAGES OBTAINED FROM A PANORAMIC IMAGE

(75) Inventors: Daisuke Kotake, Kanagawa (JP); Akihiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 09/818,627

(22) Filed: Mar. 28, 2001

(65) Prior Publication Data

US 2002/0126914 A1  Sep. 12, 2002

(30) Foreign Application Priority Data

Mar. 7, 2001  (JP) .............................. 2001-063921

(51) Int. Cl.
    *G06K 9/20* (2006.01)
(52) U.S. Cl. .................. 382/282; 358/450; 358/453; 348/36; 382/305
(58) Field of Classification Search ................. 382/282, 382/305; 358/450, 453; 348/36
    See application file for complete search history.

(56) References Cited

U.S. PATENT DOCUMENTS

| | | | | |
|---|---|---|---|---|
| 5,973,726 A | * | 10/1999 | Iijima et al. | ................... 348/38 |
| 6,005,987 A | * | 12/1999 | Nakamura et al. | .......... 382/294 |
| 6,075,559 A | * | 6/2000 | Harada | ........................ 348/148 |
| 6,337,882 B1 | * | 1/2002 | Boyer et al. | ........... 375/240.24 |
| 6,466,254 B1 | * | 10/2002 | Furlan et al. | .................. 348/36 |
| 6,563,529 B1 | * | 5/2003 | Jongerius | ..................... 348/36 |
| 6,661,455 B1 | * | 12/2003 | Toyofuku et al. | ........ 348/231.6 |
| 2002/0021353 A1 | * | 2/2002 | DeNies | ......................... 348/36 |

FOREIGN PATENT DOCUMENTS

| | | | |
|---|---|---|---|
| EP | 921376 A1 | * | 6/1999 |
| JP | 06-124328 | | 5/1994 |
| JP | 09-062861 | | 3/1997 |
| JP | 10-097640 | | 4/1998 |

OTHER PUBLICATIONS

Building Image-Based Cybercities by Using Vehicle-Mounted Cameras, T. Endo, et al. published by Shingaku Society, PA-3-4 pp. 276-277, 1997.

Generation of Wide-Range Virtual Environment by Using Photrealistic Images, by M. Hirose, et al., published in Proceedings of the Virtual Reality Society of Japan Second Annual Confrence, pp. 67-70, 1997.

* cited by examiner

*Primary Examiner*—Bhavesh M. Mehta
*Assistant Examiner*—Patrick Edwards
(74) *Attorney, Agent, or Firm*—Fitzpatrick, Cella, Harper & Scinto

(57) ABSTRACT

Each of the panoramic images corresponding to a plurality of positions of a viewpoint is compressed and stored as partial images obtained by dividing each panoramic image by a predetermined field of view. The panoramic image has a field of view wider than a display field of view of an image to be displayed on a display unit. A partial image containing an image to be reproduced is selected based on the information about the position and the direction of a viewpoint and the display field of view, and an image corresponding to the position and the direction of a viewpoint is generated and displayed from the selected partial image. Thus, when virtual space in the walk-through system is designed using the IBR technology, stored image data can be efficiently reproduced.

4 Claims, 19 Drawing Sheets

FIG.6

POSITION DATA (GPS MEASUREMENT RESULT DATA)

| TIME CODE | POSITION($\theta$) | POSITION($\phi$) |
|---|---|---|
| 00:00:00:01 | 135.000 | 35.000 |
| 00:00:00:02 | 135.002 | 35.001 |
| 00:00:00:03 | 135.004 | 35.002 |
| 00:00:00:04 | 135.005 | 35.002 |
| ... | ... | |
| 00:00:00:10 | 135.010 | 35.008 |

VIDEO DATA

| TIME CODE | FRAME NUMBER | FRAME DATA |
|---|---|---|
| 00:00:00:01 | 000001 | |
| 00:00:00:02 | 000002 | |
| 00:00:00:03 | 000003 | |
| 00:00:00:04 | 000004 | |
| : | : | |
| 00:00:00:10 | 000010 | |

FIG.12

| POSITION OF VIEWPOINT \ DIRECTION OF VIEWPOINT | 0°~60° | 60°~120° | 120°~180° | 180°~240° | 240°~300° | 300°~360° |
|---|---|---|---|---|---|---|
| (X1, y1) | FILE1-1 | FILE1-2 | FILE1-3 | FILE1-4 | FILE1-5 | FILE1-6 |
| (X2, y2) | FILE2-1 | FILE2-2 | FILE2-3 | FILE2-4 | FILE2-5 | FILE2-6 |
| -------- | -------- | -------- | -------- | -------- | -------- | -------- |

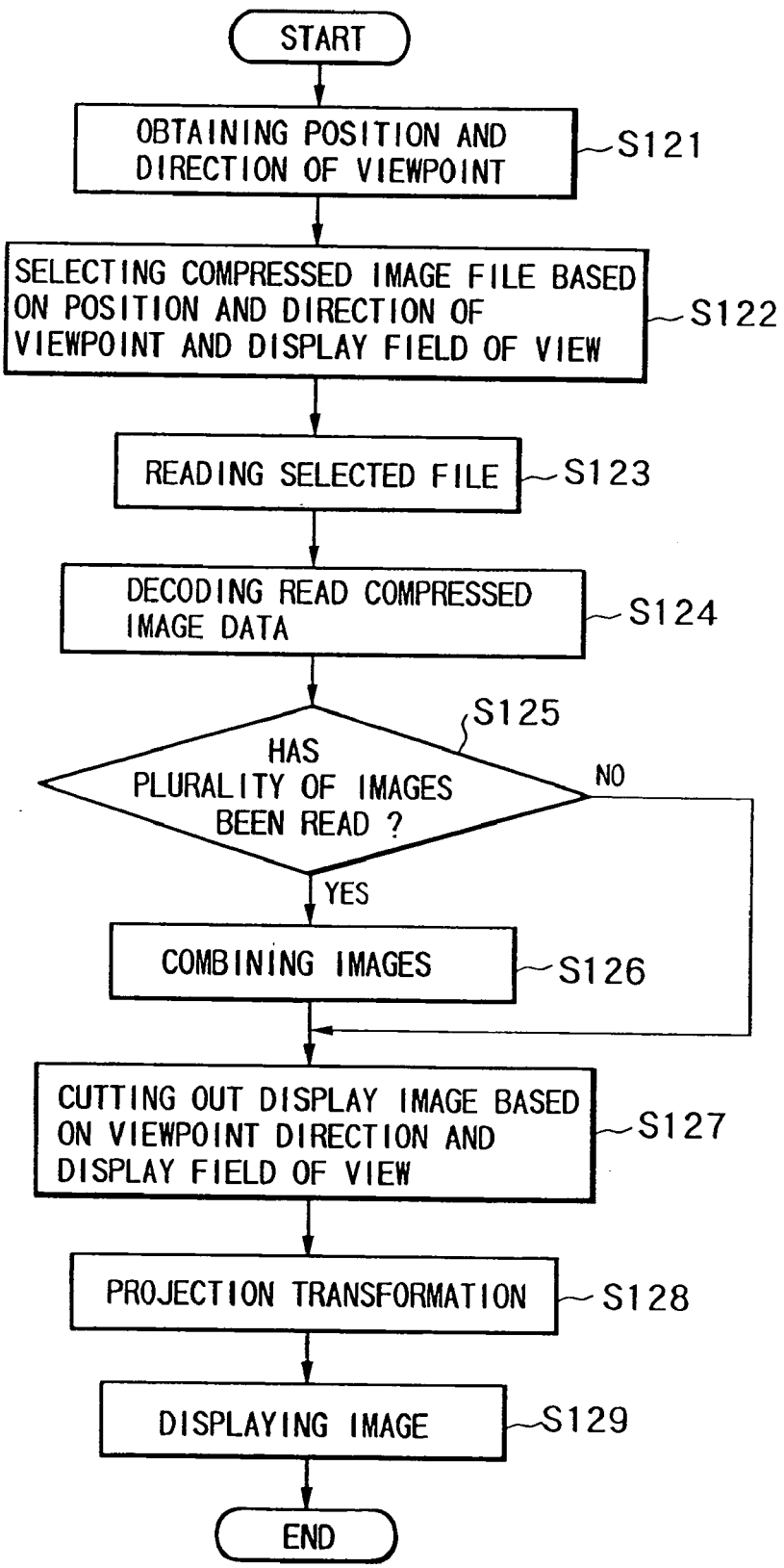

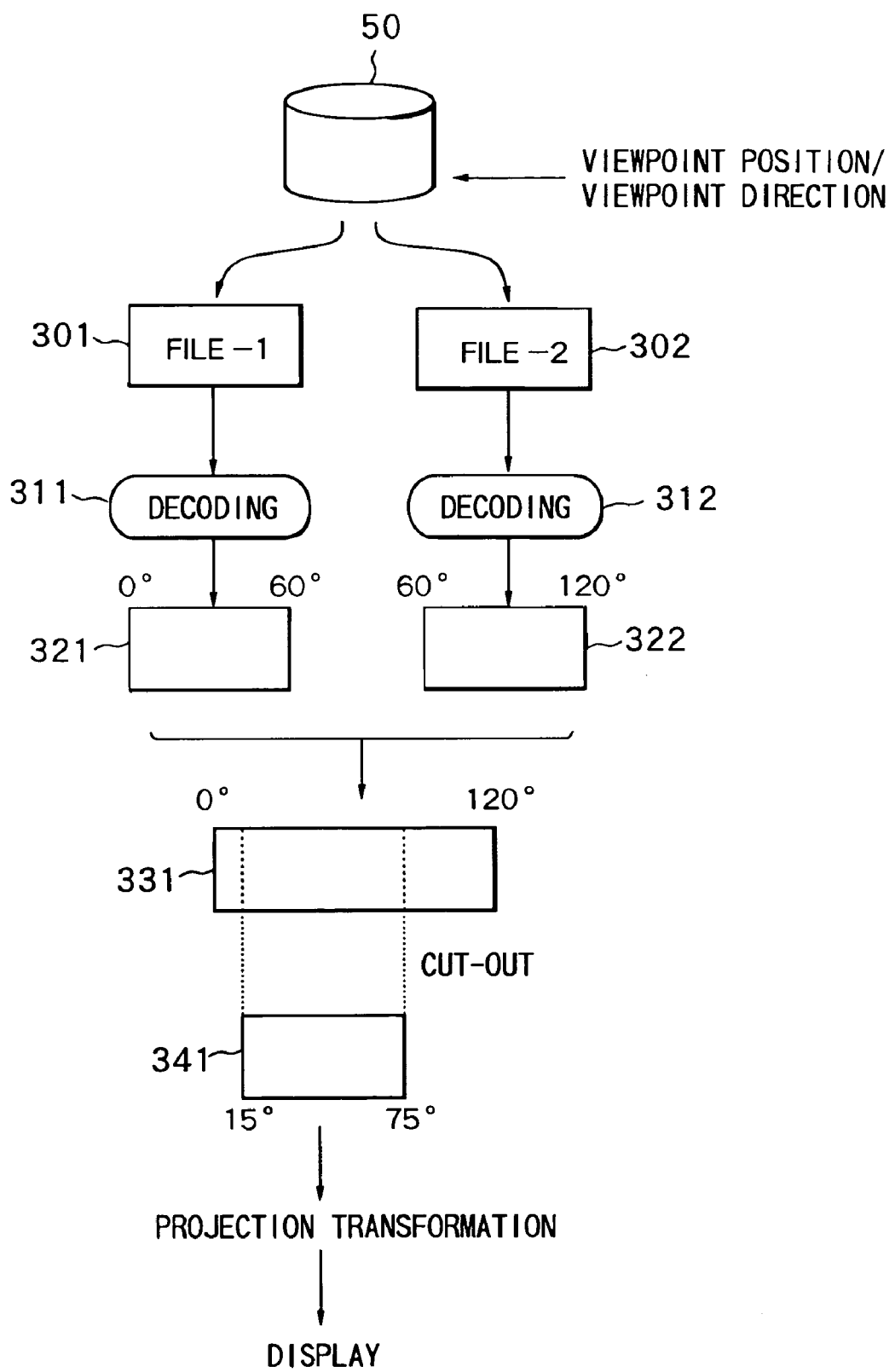

FIG.15A
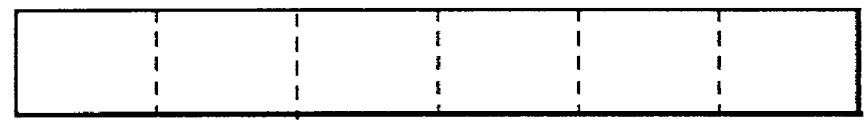
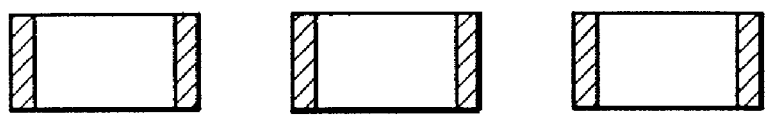
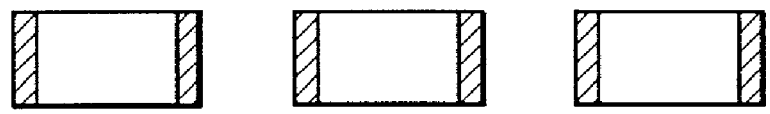
FIG.15B

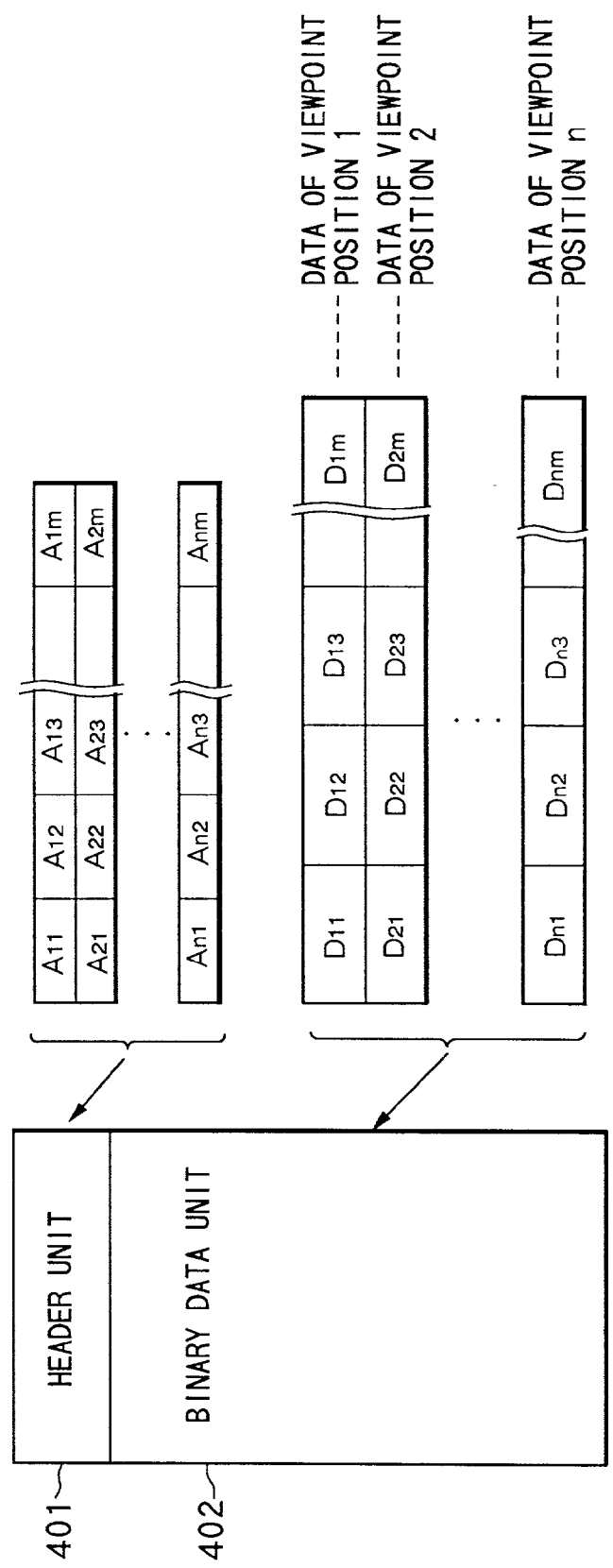

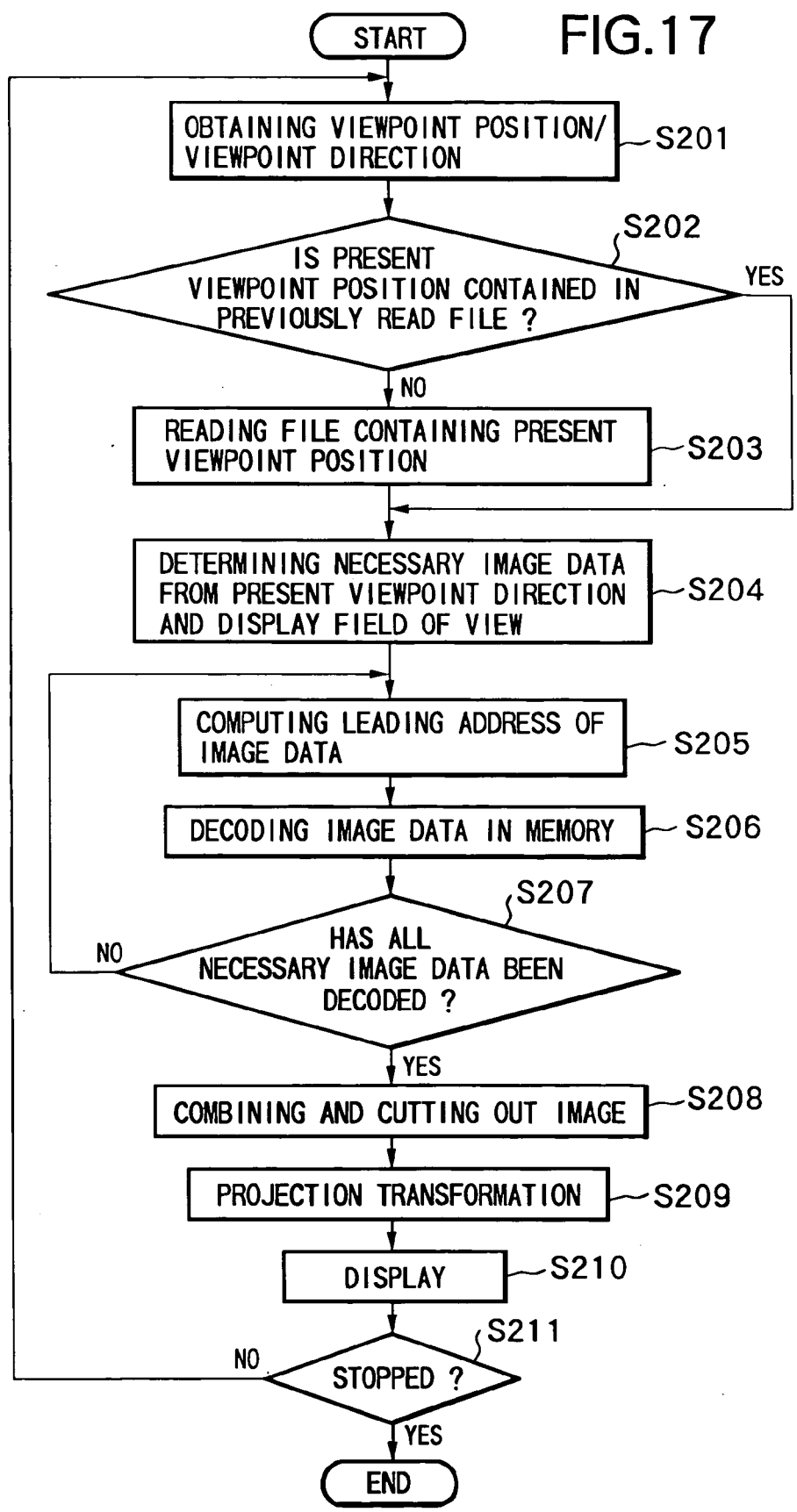

STORING AND PROCESSING PARTIAL IMAGES OBTAINED FROM A PANORAMIC IMAGE

FIELD OF THE INVENTION

The present invention relates to an image reproduction apparatus, an image processing apparatus, and a method for processing image data obtained by capturing an image in real space, and presenting the virtual space.

BACKGROUND OF THE INVENTION

Technology of capturing real space using a capture device mounted on a moving object, and representing the captured real space as virtual space using a computer based on the captured image data (for example, 'Building Image-Based Cybercities by Using Vehicle-Mounted Cameras' by Endoh, Katayama, Tamura, Hirose, Watanabe, and Tanigawa (published by Shingaku Society, PA-3–4, pp. 276–277, in 1997), 'Building Image-Based Cybercities by Using Vehicle-Mounted Cameras (2)—Generation of Wide-Range Virtual Environment by Using Photorealistic Images—' by Hirose, Watanabe, Tanigawa, Endoh, Katayama, and Tamura (published in Proceedings of the Virtual Reality Society of Japan Second Annual Conference, pp. 67–70, in 1997), etc.

A method for representing real space captured as virtual space based on the captured image data captured by the capture device mounted on a moving object can be a method of reconstructing a geometric model of real space based on captured image data, and representing it in the conventional CG technology. However, the technology is limited in correctness, precision, reality, etc. of a model. On the other hand, the image-based rendering (IBR) technology of representing virtual space using a captured image without using a model has recently attracted attention. The IBR technology produces an image from any viewpoint based on a plurality of captured images. Since the IBR technology uses captured images, realistic virtual space can be represented.

To produce walk-through system of virtual space using the above mentioned IBR technology, it is necessary to produce and present an image depending on the position in the virtual space of a user. In this type of system, each frame of captured image data is associated and stored with the position in the virtual space, the corresponding frame is obtained based on the position and the view direction of the user in the virtual space, thereby reproducing the frames.

As a common method of obtaining the position data in the real space, the position measurement system using an artificial satellite represented by the GPS (Global Positioning System) which is also used for a car navigation system, etc. A method of associating the position data obtained in the GPS with the captured image data can use a time code (Japanese Patent Application laid-open No. 11-168754). In this method, each frame of captured image data can be associated with position data by associating the time data contained in the position data with the time code added to each frame of captured image data.

In the walk-through presentation in the above mentioned virtual space, a user can see a desired direction from his or her viewpoint. Therefore, an image at each viewpoint is stored as a panoramic image covering a range wider than an image to be reproduced, a partial image to be reproduced is cut out and displayed from the panoramic image based on the position and the direction of the viewpoint of the user in the virtual space.

However, an image actually displayed in the walk-through system is a part of a panoramic image. Although the other portions are not used, it is necessary to read data or perform a decoding process on the entire panoramic image, thereby performing an inefficient process. That is, to display an image, it is necessary to read the entire panoramic image depending on the position of a user, decode the entire panoramic image when it is compressed, cut out a partial image from the obtained image data depending on the direction of the view of the user, and then display the image. Although the reading and decoding processes are performed on the entire panoramic image, only a part of it is practically used for display, and other portions are wastefully processed.

Especially when a full round image or a full sky image is used as a panoramic image, most of the processes of reading and decoding the panoramic image at each viewpoint position are not required and wasteful when the image is actually displayed. That is, the computer is excessively loaded, thereby disabling the walk-through system in reproducing and displaying images in real time.

SUMMARY OF THE INVENTION

The present invention has been developed to solve the above mentioned problems, and aims at efficiently reproducing stored image information when virtual space is designed in a walk-through system using the IBR technology, and improving real-time reproducibility.

To attain the above mentioned purposes, the image reproduction apparatus according to the present invention has the following configuration. That is, the apparatus includes: storage means for storing a panoramic image as partial images obtained by dividing the entire panoramic image by a predetermined field of view, wherein the panoramic image has a field of view wider than the field of view of the image displayed on display means; selection means for selecting any of the partial images stored in the storage means based on the information about the position and the direction of a viewpoint, and the field of view of the image displayed on the display means; and generation means for generating an image corresponding to the position and the direction of a viewpoint from the selected partial image, and providing the generated image for the display means.

Furthermore, to attain the above mentioned purposes, the image reproducing method according to the present invention includes the following steps. That is, the method includes: a storing step for storing in storage means a panoramic image as partial images obtained by dividing the entire panoramic image by a predetermined field of view, wherein the panoramic image has a field of view wider than the field of view of the image displayed on display means; a selecting step for selecting any of the partial images stored in the storage means based on the information about the position and the direction of a viewpoint, and the field of view of the image displayed on the display means; and a generating step for generating an image corresponding to the position and the direction of a viewpoint from the selected partial image, and providing the generated image for the display means.

Furthermore, to attain the above mentioned purposes, the image processing apparatus according to the present invention has the following configuration. That is, the apparatus includes: division means for dividing an image having a predetermined field of view into a plurality of partial images; compression means for compressing each of the partial images divided by the division means; storage means for adding position information to each of the partial images compressed by the compression means and storing the image; input means for inputting position information; and decoding means for reading a corresponding partial image from the storage means according to the position information input by the input means, and decoding the image.

Furthermore, to attain the above mentioned purposes, the image processing method according to another aspect of the present invention includes the following steps. That is, the method includes: a dividing step of dividing an image having a predetermined field of view into a plurality of partial images; a compressing step of compressing each of the partial images divided in the dividing step; a storing step of adding position information to each of the partial images compressed in the compressing step and storing the image in storage means; an inputting step of inputting position information; and a decoding step of reading a corresponding partial image from the storage means according to the position information input in the inputting step, and decoding the image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of the state of storing video data and position data (GPS measurement result data) stored in the image data storage unit 10;

FIG. 12 shows an example of the data configuration of the file management table;

FIG. 13 is a flowchart of the procedure of generating and displaying the image to be displayed according to the first embodiment of the present invention;

FIG. 14 shows the type of the operation of generating a display image according to the present embodiment, that is, the operation of the image reproduction control unit 60;

FIGS. 15A and 15B show the range of the image angle of a partial image according to the second embodiment of the present invention;

FIG. 16 shows an example of the format of storing data in a file according to the third embodiment of the present invention;

FIG. 17 is a flowchart of the procedure of generating and displaying a display image according to the third embodiment of the present invention;

DETAILED DESCRIPTION OF THE PREFERRED EMBODIMENTS

Preferred embodiments of the present invention will now be described in detail in accordance with the accompanying drawings.

[First Embodiment]

Described first is a walk-through system of virtual space according to the present embodiment. According to the present embodiment, panoramic image data is generated from captured image data obtained by a plurality of capture devices mounted on a moving object such as a vehicle, etc., and the panoramic image data is stored after associated with the map data indicating the position in the real space. Then, depending on the position and the direction of the viewpoint of the user in the virtual space, a display image is produced from the stored panoramic image data, thereby realizing walk-through in the virtual space.

Figure 1:
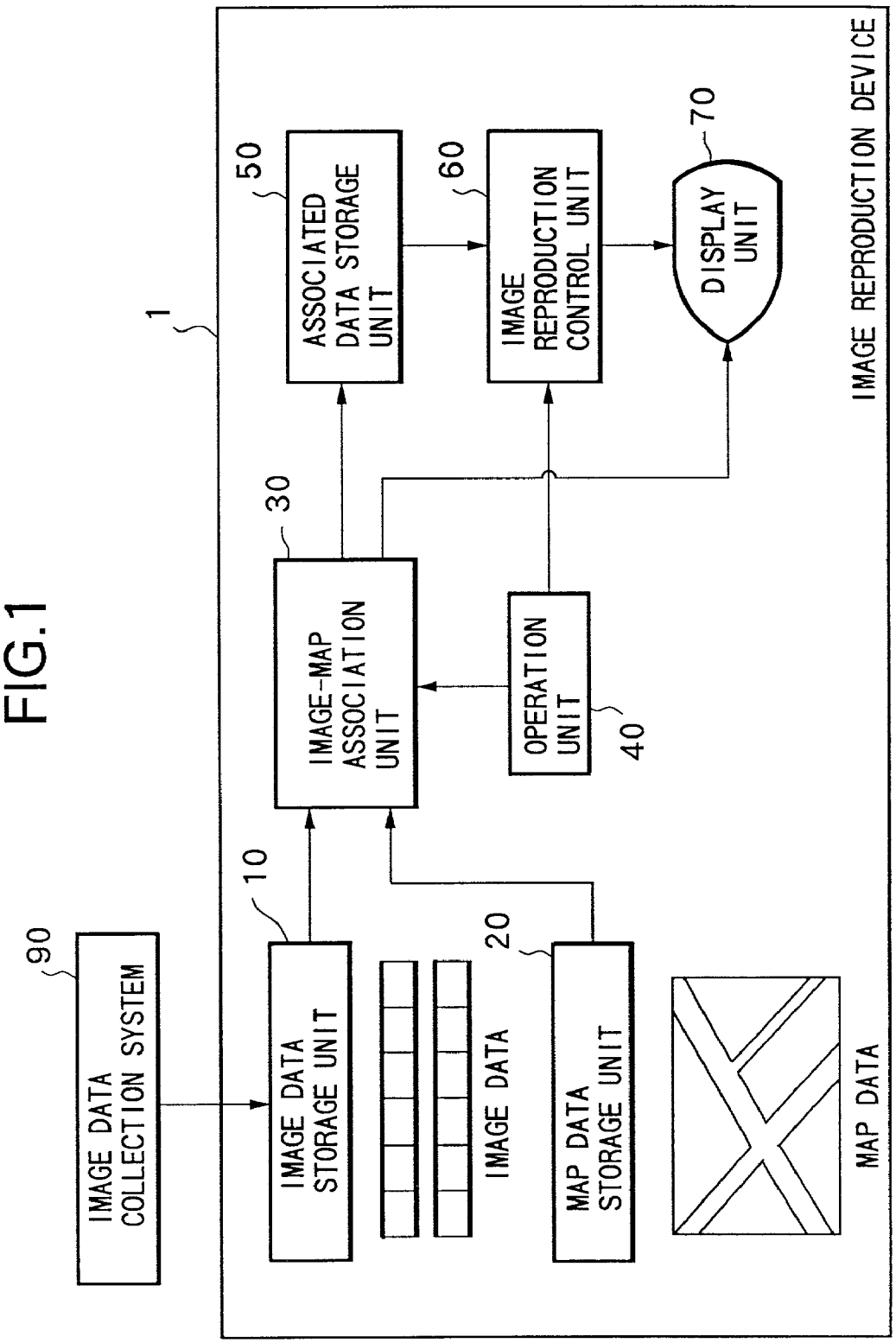
FIG. 1 is a block diagram of the configuration showing the function of the walk-through system according to an embodiment of the present invention.

FIG. 1 is a block diagram of the configuration showing the function of the walk-through system according to the present embodiment. The walk-through system comprises the image data collection system 90 and the image reproduction device 1. The image reproduction device 1 comprises the image data storage unit 10, a map data storage unit 20, an image-map association unit 30, an operation unit 40, an associated data storage unit 50, an image reproduction control unit 60, and a display unit 70.

The image data storage unit 10 stores frame data as captured image data obtained by the image data collection system 90 described later. The map data storage unit 20 stores map data containing map image information and coordinate information for representation of each position on the map image using coordinates of longitude and latitude. The map data storage unit 20 stores at least the map data, captured by the image data collection system 90, in the range corresponding to the position in the real space of the frame data stored in the image data storage unit 10. The map data is stored in the hard disk, RAM or another external storage device not shown in the attached drawings.

The image-map association unit 30 generates panoramic image data at each viewpoint position from the frame data stored in the image data storage unit 10, and associates with data with the map data stored in the map data storage unit 20. Thus, the associated panoramic image data and the map data are stored as the associated data in the associated data storage unit 50. The image-map association unit 30 generates a panoramic image from the frame data obtained by a plurality of capture devices at the same time, specifies corresponding map data (position data on the map) from the GPS information at the time, associates and stores them in the associated data storage unit 50. As described later, a time code is added to each piece of the frame data obtained from the GPS information and by the plurality of capture devices. According to the time code, frames of the same time and the GPS information are obtained.

The operation unit 40 is provided with a mouse, a keyboard, a joy stick, etc. In the image-map association unit 30, it is also possible to edit the association between the frame stored in the image data storage unit 10 and the map data stored in the map data storage unit 20 by an operation from the operation unit 40.

The image reproduction control unit 60 determines the position (on the map) and the direction of the viewpoint of the user according to the input of an operation from the operation unit 40, reads necessary image data from the data stored in the associated data storage unit 50, and generates image data to be displayed on the display unit 70.

Figure 2:
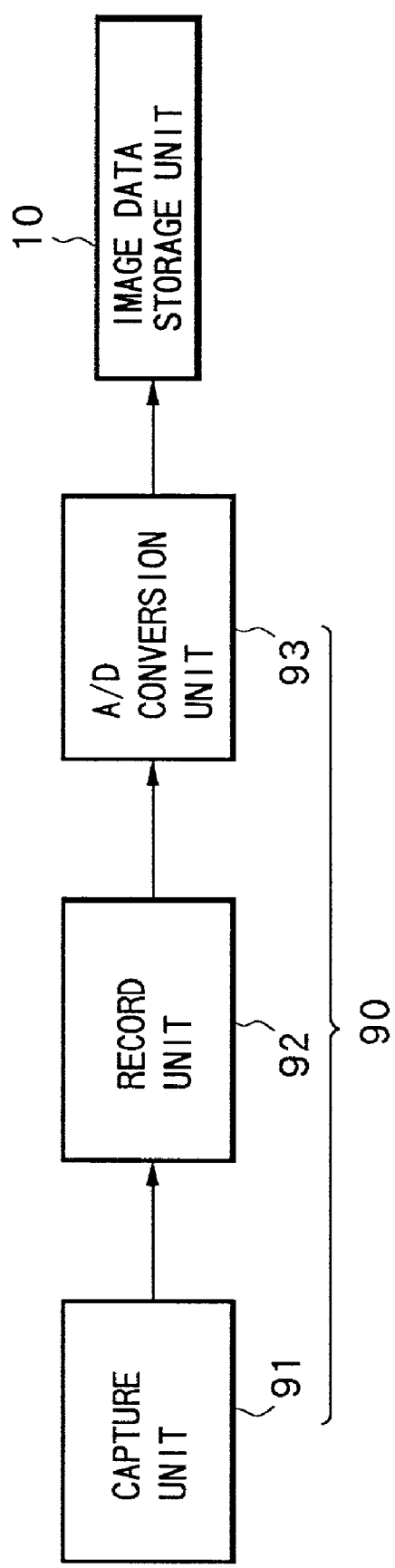
FIG. 2 shows an example of the configuration of an image data collection system 90 for collecting frame data stored in an image data storage unit 10.

FIG. 2 shows an example of the configuration of the image data collection system 90 for collecting the frame data stored in the image data storage unit 10. As shown in FIG. 2, the image data collection system 90 comprises the capture unit 91, the record unit 92, and the A/D conversion unit 93. Each unit is described below in detail by referring to FIGS. 3 through 5.

Figure 3:
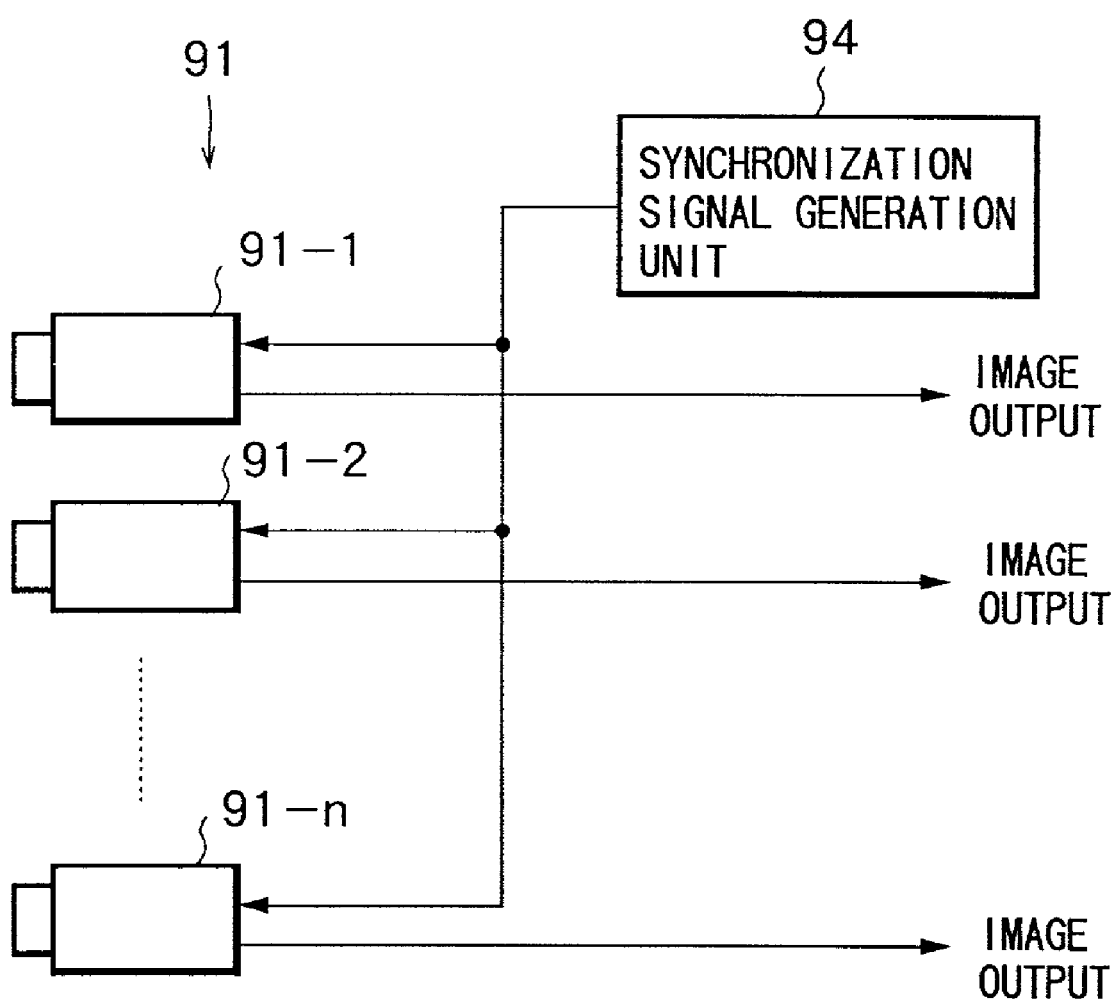
FIG. 3 is a block diagram showing in detail the configuration of a capture unit 91.

FIG. 3 is a block diagram of the detailed configuration of the capture unit 91. According to the present embodiment, the capture unit 91 is mounted on a moving object such as a vehicle, etc. The capture unit 91 comprises n (n≧1) video cameras (91-1 through 91-n) and a synchronization signal generation unit 94. The video cameras 91-1 through 91-n can receive an external synchronization signal from the synchronization signal generation unit 94. According to the present embodiment, the capturing timings of the n video cameras 91-1 through 91-n can match with one another using an external synchronization signal output from the synchronization signal generation unit 94.

Figure 4:
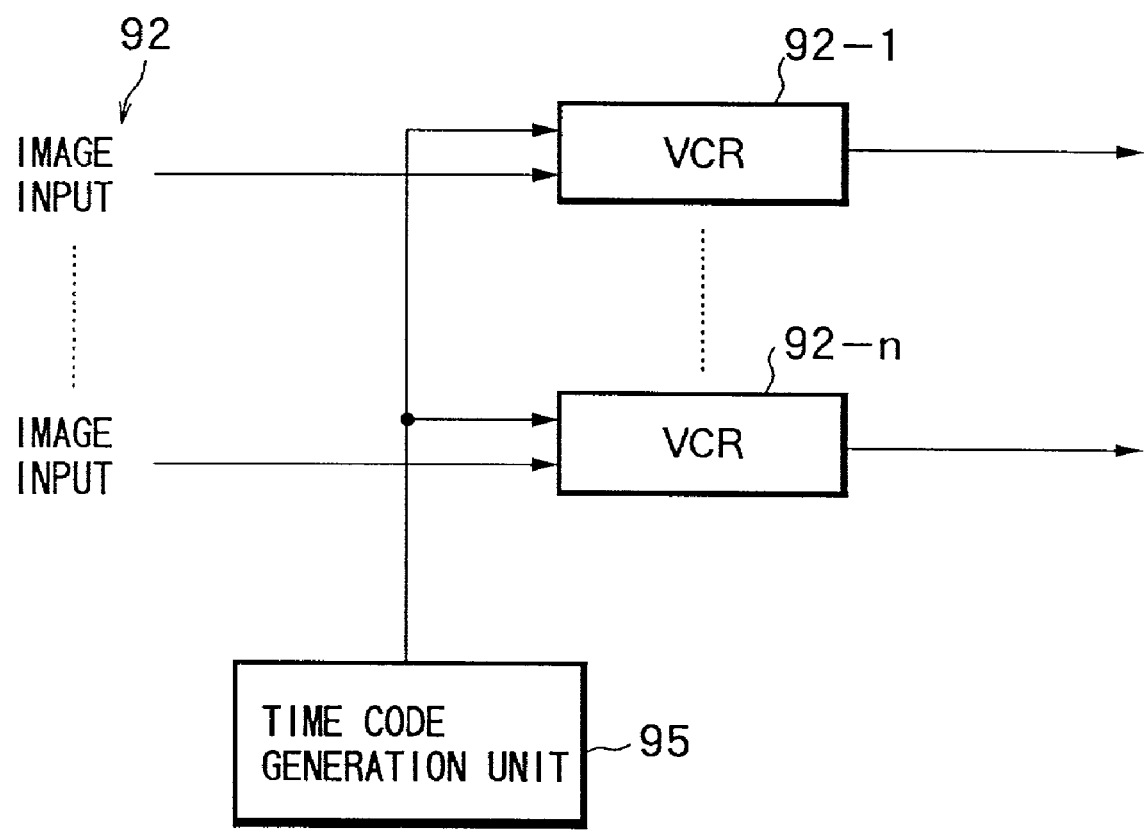
FIG. 4 is a block diagram showing in detail the configuration of a record unit 92.

FIG. 4 is a block diagram of the detailed configuration of the record unit 92. The record unit 92 comprises a time code generation unit 95 and record units (video cassette recorders VCR according to the present embodiment) 92-1 through 92-n corresponding to the video cameras 91-1 through 91-n. The output images from n video cameras 91-1 through 91-n of the capture unit 91 are input to the VCR 92-1 through 92-n respectively. The time code generation unit 95 provides a time code indicating a capturing time for each of the VCR 92-1 through 92-n. The VCR 92-1 through 92-n fetch the image input from the corresponding video camera and the time code from the time code generation unit 95, and record it as video data with the time code.

Figure 5:
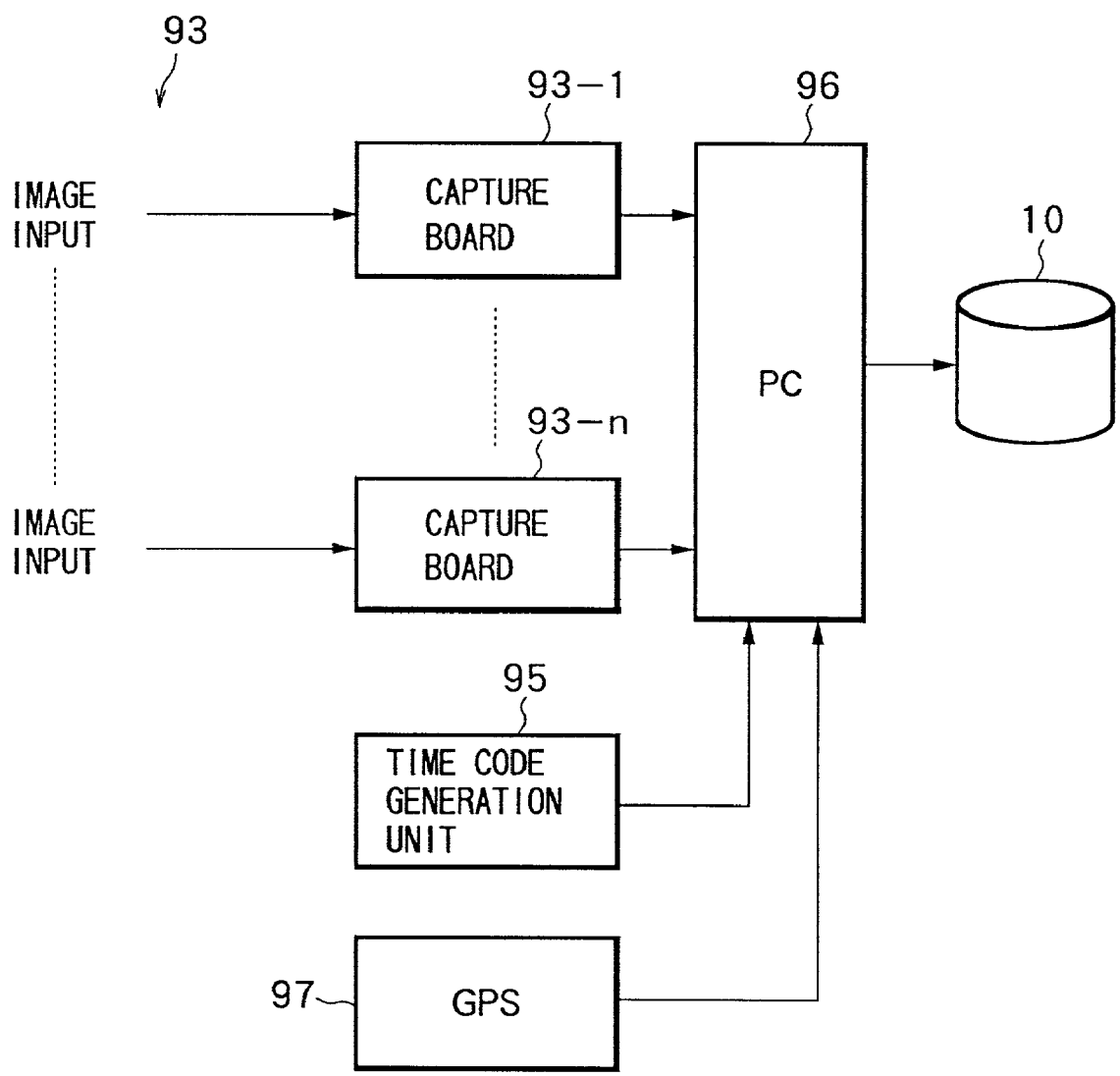
FIG. 5 is a block diagram showing in detail the configuration of an A/D conversion unit 93.

As described above, the image information collected in each of the VCR 92-1 through 92-n is converted into digital image data by the A/D conversion unit 93, and stored in the image data storage unit 10. FIG. 5 is a block diagram of the detailed configuration of the A/D conversion unit 93. The A/D conversion unit 93 comprises a personal computer (hereinafter referred to as a PC) 96, and video capture boards (hereinafter referred to as capture boards) 93-1 through 93-n respectively corresponding to the VCR 92-1 through 92-n. The capture boards are not always required for respective video cameras, but can be as many as each PC can include. The A/D conversion unit 93 converts analog image data provided from each VCR into digital image data (for example, in an AVI format), and stores the data in the image data storage unit 10 containing a hard disk, etc. or another storage medium connected to the PC 96.

In the present system, position data is obtained from a GPS 97 at a timing of the time code generation unit 95 generating a time code, and the obtained position data is associated with the time code at that time, and is then stored.

FIG. 6 shows an example of the state of storing video data and position data (GPS measurement result data) in the image data storage unit 10. As shown in FIG. 6, the image data storage unit 10 stores a frame to which a time code is added and position data to which a time code is added. Therefore, the frame and the position data are associated with each other through the time code. In FIG. 6, video data from only one video camera is shown, but the video data is output from the corresponding number (n) of video cameras as described above.

The computation of the three-dimensional position in the GPS is well known, and is not described in detail here. As described above, while images are captured by n video cameras, the latitude and longitude data P (θ, φ) sequentially obtained by the GPS is associated with the time code from a time code generation unit 72, and is then stored. Therefore, each frame of the video data can be associated with the latitude and longitude data obtained from the GPS through the time code.

When image data is fetched to the PC 96 through the capture boards 93-1 through 93-n, the capture start and end portions are determined according to recorded time codes such that the digital image data obtained through n VCR and capture boards can comprise the data of the same length and captured at the same time.

Figure 7:
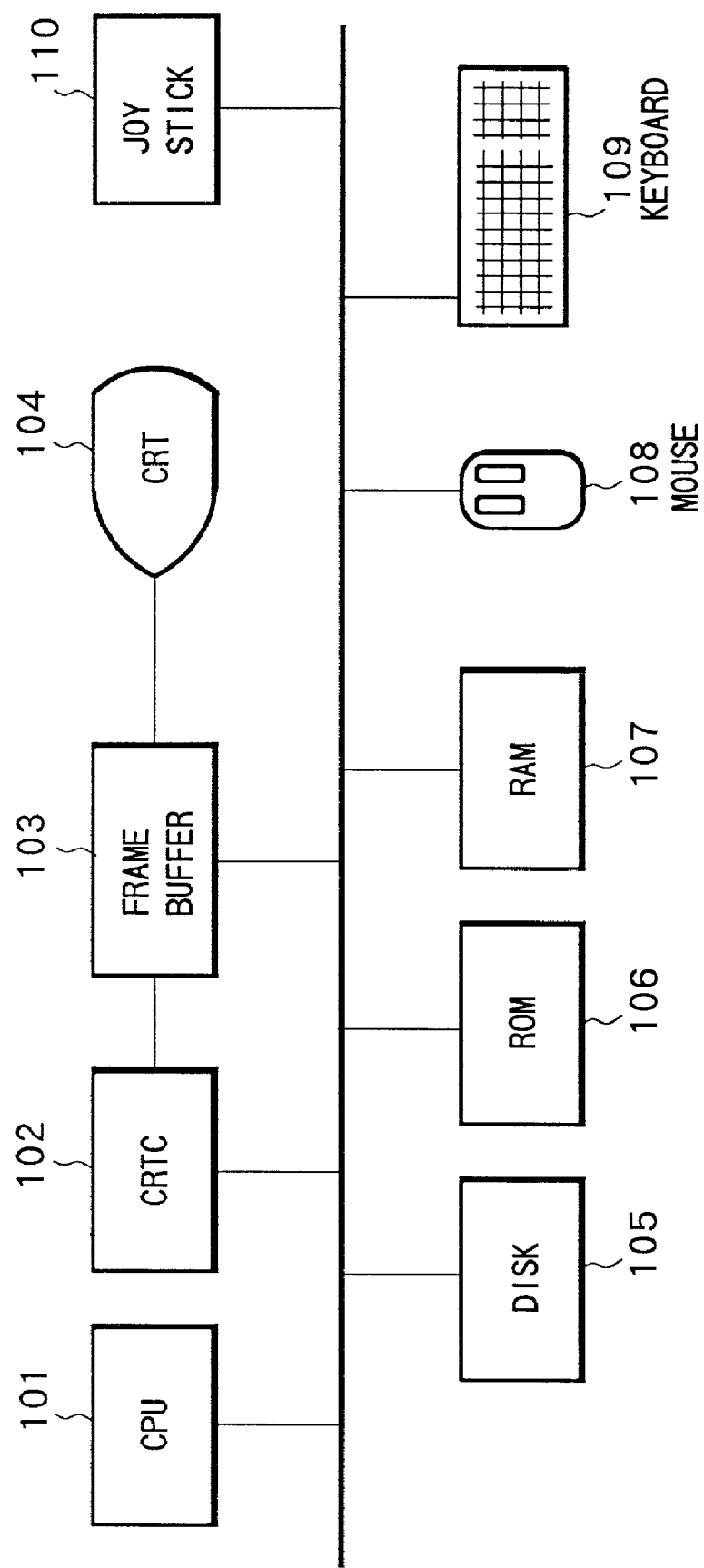
FIG. 7 is a block diagram of the configuration of the hardware of an image reproduction device 1 according to an embodiment of the present invention.

Described below is the image reproduction device 1. FIG. 7 is a block diagram of the configuration of the hardware of the image reproduction device 1 according to the present embodiment. The configuration of the hardware shown in FIG. 7 is similar to the configuration of a common personal computer. In FIG. 7, a disk 105 comprises the image data storage unit 10, and stores the frame data and position data obtained by the image data collection system 90 as described above by referring to FIGS. 2 through 6. The disk 105 comprises not only the above mentioned image data storage unit 10, but also the map data storage unit 20 and the associated data storage unit 50 shown in FIG. 1.

The CPU 101 functions as the image-map association unit 30 for associating image data with map data, or the image reproduction control unit 60 for reproducing an image based on the image data stored in the associated data storage unit 50 by executing a program stored in a disk 105 or ROM 106 or an external storage device (not shown in the attached drawings).

By a CPU 101 issuing various display instructions to a display controller 102, the display controller 102 and a frame buffer 103 display desired data on a display unit 104. In FIG. 7, a CRT is shown as the display controller 102, and a CRT is shown as the display unit 104. However, it is obvious that the display unit is not limited to a cathode-ray tube, but a liquid crystal display, etc. can be used. The display controller 102, the frame buffer 103, and the display unit 104 form the above mentioned display unit 70. A mouse 108, a keyboard 109, and a joy stick 110 are used to input an operation of a user to the image holding and reproduction device 1, and form the above mentioned operation unit 40.

Figure 8:
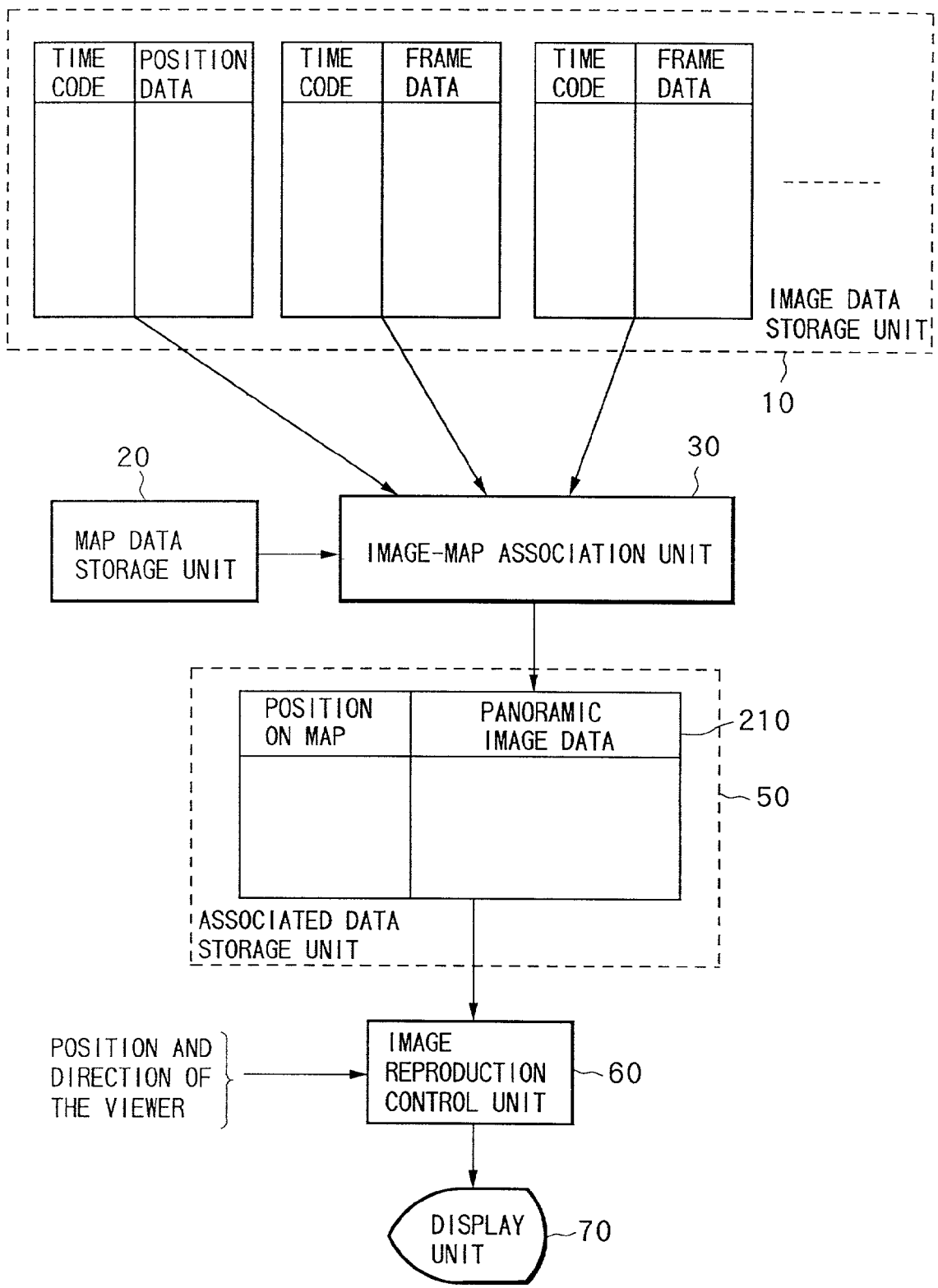
FIG. 8 shows the contents of the process of the image reproduction device 1 in a walk-through system according to an embodiment of the present invention.

Described below is the outline of the operation of the image reproduction device 1 in the walk-through system according to the present embodiment with the above mentioned configuration. FIG. 8 shows the contents of the process of the image reproduction device 1 in the walk-through system according to the present embodiment.

By the above mentioned image data collection system 90, the image data storage unit 10 stores frame data with a time code based on the video data obtained by the n video cameras 91-1 through 91-n, and the position data with a time code based on the position data obtained by the GPS 97.

The image-map association unit 30 generates a panoramic image by combining frame data having the same time codes, and converts the position data corresponding to the time code by referring to the map data held by the map data storage unit 20 into the position on the map. Then, it generates associated data 210 obtained by the obtained panoramic image with the position on the map, and stores the result in the associated data storage unit 50.

The associated data storage unit 50 stores data as follows according to the present embodiment. That is, using a cross and a corner as a sectional point, a line enclosed by sectional points is defined as a road, an ID is assigned to each sectional point and road, and the ID is added to a corresponding frame. A frame group corresponding to a road is assigned numbers in order from the leading frame.

Figure 9:
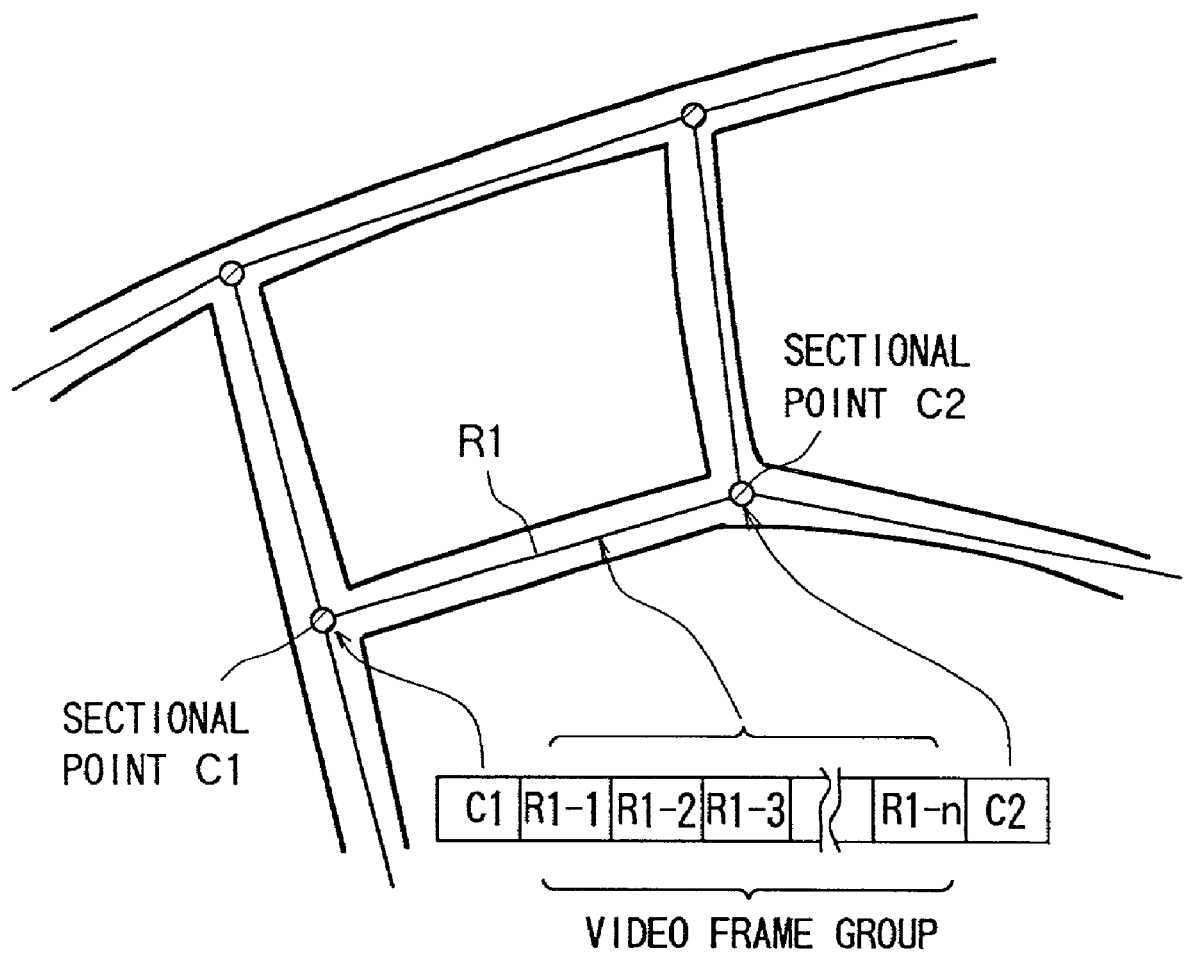
FIG. 9 shows the frame data as a sectional point associated with a corresponding road on a map.

FIG. 9 shows the above mentioned process. In FIG. 9, a line enclosed by a sectional point having an ID of C1 and a sectional point having an ID of C2 is assigned an ID of R1. The correspondence between the IDs and the map is stored in the map data storage unit 20.

When a frame corresponding to the sectional points C1 and C2 are specified based on the GPS data, etc., the frame group enclosed by the frames corresponds to the road R1. In FIG. 9, there are n frames in the frame group. The frames corresponding to the sectional points C1 and C2 are assigned the IDs of C1 and C2 respectively, and each frame of the frame group is sequentially assigned R1-1 through R1-n.

The correspondence between a sectional point and a frame is automatically performed based on the GPS data. A user can also associate them by specifying a frame and a corresponding cross on the map while reproducing video data. In this case, the position of each frame of a frame group enclosed by sectional points can be assigned at an equal distance in a line connecting the sectional points (assigning n frames at the position of each division by equally dividing the line connecting C1 and C2 by n+1 in the above mentioned example), thereby configuring the system without the GPS.

Thus, the walk-through presentation is reproduced using the stored associated data. When the operation unit 40 performs a walk-through operation using the joy stick 110, etc., the position (on the road of the map) and the direction of the viewpoint of the user can be generated correspondingly. The image reproduction control unit 60 obtains an image to be displayed on the display unit 70 from the associated data 210 based on the generate position and the direction of a viewpoint, and the field of view of the image displayed on the display unit 70, and has the display unit 70 display the image. For example, when the user is looking in the 15° direction at the point a on the map, a partial image corresponding to the 15° direction of the panoramic image at the point a is extracted. Then, for the position and the direction of the viewpoint of the user sequentially determined as the position of the user on the map moves with the movement of the position of the user, the image reproduction control unit 60 obtains a displayed image as described above, and displays the obtained image on the display unit 70, thereby realizing the walk-through presentation.

With the above mentioned configuration, when the panoramic image (360° full round image according to the present embodiment) stored in the associated data storage unit 50 is read to the memory to generate an image at a desired field of view in an arbitrary direction, only a part of panoramic image is used as required images. For example, when an image having a field of view of 60° is cut out from a 360° full round image, the process of reading and decoding the data on the remaining 300° image (⅚ of the entire data) is wasted. Therefore, reading the entire panoramic image is a waste of time and memory resources. Especially when a panoramic image is compressed by the JPEG, etc., the entire panoramic image has to be decoded, thereby incurring a delay in a display timing.

In the walk-through system according to the present embodiment, to solve the above mentioned problems, a panoramic image can be divided and read in a partial image unit, thereby reducing the data reading and decoding processes and realizing an efficient process.

Figure 10:
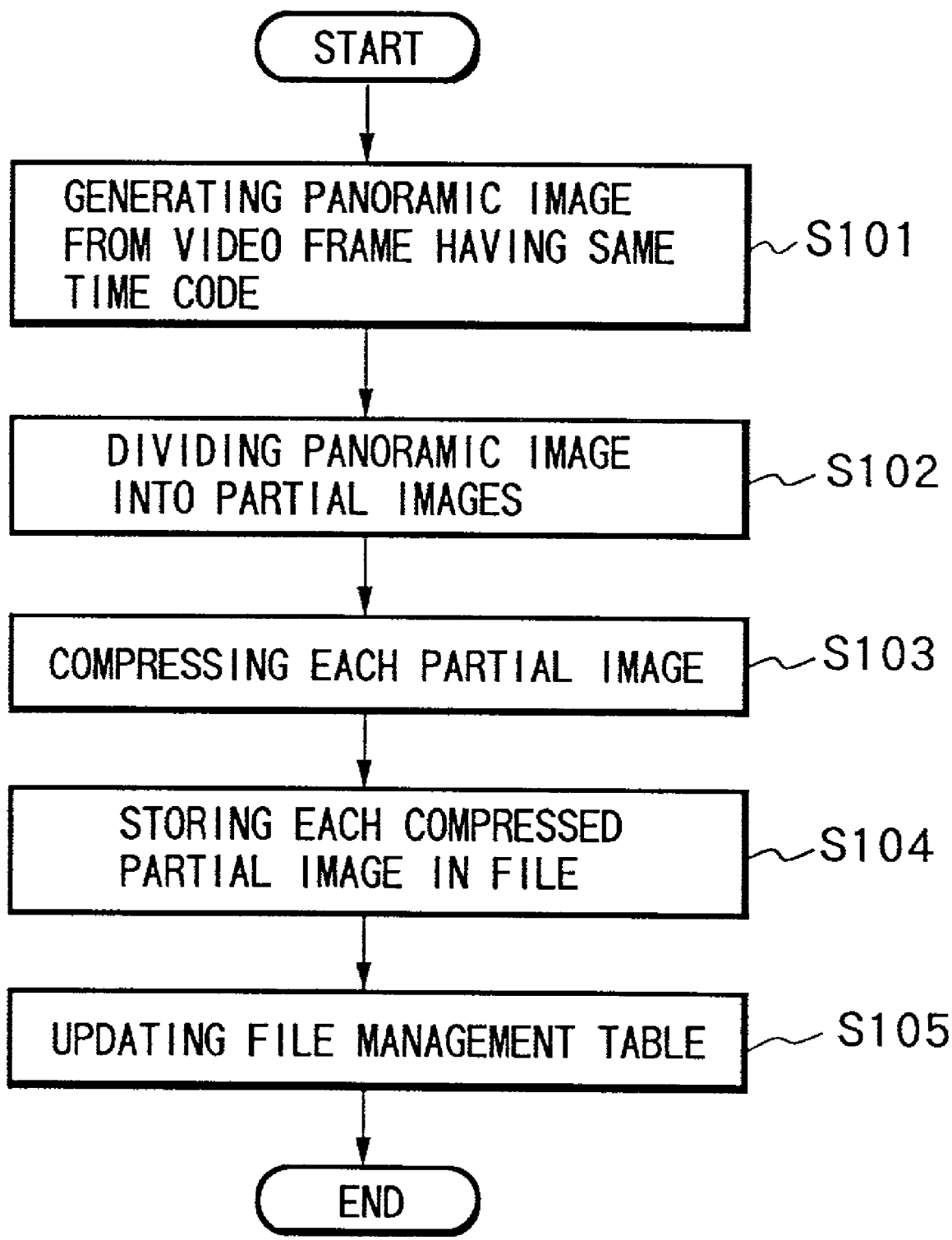
FIG. 10 is a flowchart of the process of storing associated data according to the first embodiment of the present invention.
Figure 11:
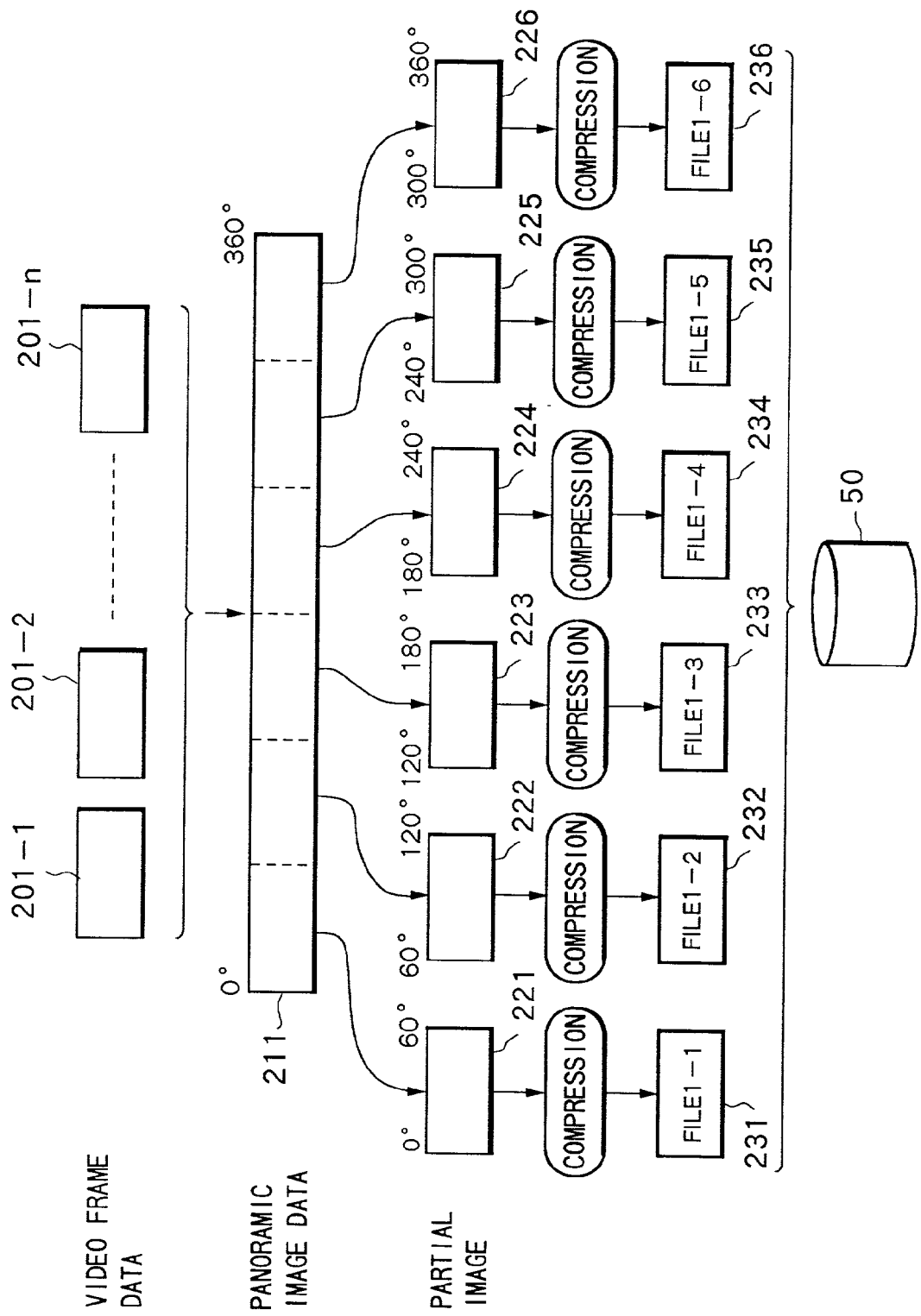
FIG. 11 shows the type of the process of storing the associated data according to the first embodiment of the present invention.

FIG. 10 is a flowchart of the procedure of storing associated data according to the first embodiment. FIG. 11 shows a type of the process of storing the associated data according to the first embodiment.

First, in step S101, the frame data having the same time code is collected from the image data storage unit 10, and combines the data into a full round panoramic image. According to the present embodiment, n video cameras are arranged such that their optical axes can be radiantly placed at an angle of 360°/n. n frame data 201-1 through 201-n having the same time code are combined into a 360° full round panoramic image 211.

In the next step S102, the panoramic image data 211 obtained in step S101 is divided into partial images of a predetermined field of view. According to the present embodiment, the panoramic image data 211 is divided into six partial images 221 to 226 having a field of view of 60°. In step S103, each of the partial images 221 to 226 is individually compressed, and each piece of the obtained compressed partial image data is stored as a file in the disk 105 in the step S104. Finally, six files 231 through 236 can be obtained from one panoramic image data 211, and stored in the associated data storage unit 50.

In step S105, a file management table showing the correspondence between the position and the direction of a viewpoint and each file stored in step S104 is generated and updated, and stored in the associated data storage unit 50. The position of a viewpoint corresponds to the position on a map, and can be obtained from the GPS data having the same time code as the frame data used in generating the panoramic image and the map data. It is obvious that data can be stored as sectional points associated with a road as shown in FIG. 9.

FIG. 12 shows an example of the configuration of data of the file management table. For example, in FIG. 11, the panoramic image data 211 is an image at the position (x1, y1) on the map, and the generated files 231 to 236 contain the compressed image data indicating partial images cut out in the range of 60°. The names of the files are File 1-1 to 1-6. In this case, the file names File 1-1 to 1-6 are associated with the positions (x1, y1) on the map, and the file name is associated with each angle range of the panoramic image in each file. Therefore, by referring to the file management table, a partial image file required to generate an image to be displayed on the display unit 70 can be easily read based on the position and the direction of a viewpoint. Described below is the process of generating an image to be displayed on the display unit 70.

FIG. 13 is a flowchart showing the procedure of generating and displaying an image according to the first embodiment. FIG. 14 shows the process of generating an image to be displayed according to the present embodiment, that is, the type of the operation of the image reproduction control unit 60. In the following explanation, the field of view of the compressed partial image file and the displayed image is 60°. However, it is obvious that the field of view is not limited to this application.

First, in step S121, the position and the direction of a viewpoint of an image to be displayed depending on the operation input from the operation unit 40 are obtained. In step S122, the partial image required to reproduce an image is determined based on the position and the direction of a viewpoint obtained in step S121. For example, assuming that the position of a viewpoint is (x1, y1), and the direction of the viewpoint is 45°, the field of view of an image to be displayed is 60°, that is, in the range from 15° to 75°. Therefore, the compressed file of partial images containing the range of images, that is, File 1-1 (301) and File 1-2 (302) are selected from the file management table shown in FIG. 12.

Then, in step S123, the files selected in step S122 are read, and the compressed image data of these files are decoded (311, 312) in step S124 to obtain the partial images 321 and 322. Then, in step S125, it is determined whether or not a plurality of partial images have been obtained in the above mentioned processes. If it is determined that a plurality of partial images have been obtained, control is passed to step S126. In step S126, the decoded images are combined. Since two partial images have been obtained in the above mentioned example, control is passed to step S126, the two decoded partial images (each having the field of view of 60°) are combined to obtain an image 331 having a field of view of 120°. Then, in step S127, a partial image in a range of 60° from the direction of the viewpoint is cut out from the image obtained in step S126. In step S128, a projection converting process is performed from a panoramic image to an image plane, and the result is displayed in step S129. For example, when the direction of the viewpoint is 45°, a partial image 341 in a range from 15° to 75° is cut out from the partial image 331 having the field of view of 0° to 120° obtained in the process in step S126, and is then displayed. If it is determined in step S125 that only one partial image has been obtained, then control is passed directly to step S127 to obtain a display image from the partial image. For example, if the direction of a viewpoint is 150°, it is necessary to select only one File 1–3 having a field of view of 120° to 180°. Therefore, one partial image is obtained. According to the present embodiment, since the field of view of a partial image and the display field of view are 60°, the partial image is an image to be displayed as is, thereby omitting the cut-out in step S127.

As described above, according to the first embodiment, when an image is reproduced in the walk-through system, the reading and decoding processes are performed on a part of image data, not on the entire panoramic image covering all directions of viewpoints, thereby saving time required in reading and decoding data, and shortening the time taken in reproducing an image. Although a process of combining partial images (step S125) is newly added, the required time is much shorter than the processing time required to decode the entire panoramic image, thereby shortening the entire processing time in reproducing and displaying an image.

[Second Embodiment]

According the above mentioned first embodiment, a panoramic image is divided into a plurality of partial images and stored. However, each of the partial images can share an overlapping area with each other.

FIGS. 15A and 15B show the range of the field of view of a partial image according to the second embodiment. The partial images 221 to 226 shown in FIG. 11 have the field of view of 60° equal to that of the display image. On the other hand, as shown in FIG. 15A, each partial image has a field of view larger than 60°, which equals the field of view of the display image, and shares an overlapping portion with an adjacent partial image. The hatched portion of each partial image is the portion beyond the 60° range of the image indicating the overlapping portion shared with the adjacent partial image.

By having an overlapping portion as described above, a high quality combined image can be obtained in step S125. That is, since each partial image is individually compressed, there can be the possibility that discontinuity appears at the joint of partial images. This problem can be reduced by combining the two partial images with each of them appropriately weighted. Furthermore, since the field of view of one partial image can be extended, there can be the possibility that an image can be successfully extracted from one partial image, thereby shortening the time required to reproduce and display the image.

In FIG. 15B, a partial image is generated such that its field of view can be twice (120° in FIG. 15B) as wide as that of the display image. In this case, each portion of the partial image necessarily overlaps another partial image. In addition, since the field of view of the display image is half (60°) of the partial image, the display image can be cut out from one partial image without fail. That is, although the amount of stored image data doubles, it is not necessary to combine images in step S125. As a result, the processing time can be further shortened when an image is reproduced and displayed.

[Third Embodiment]

According to each of the above mentioned embodiments, it is necessary to read one or more files for each position of a viewpoint because the data of one partial image is stored in a file. Since it takes some time to access (retrieve) a file, it is better reduce the file reading process. That is, a process can be performed at a higher speed by reducing the number of times of the file reading processes as well as reducing the amount of data to be decoded using partial images. Therefore, according to the third embodiment, a file contains a plurality of partial images to further raise the processing speed by reducing the number of times of file accessing processes as well as by dividing a panoramic image for storage.

In the following explanation, each of n panoramic images is divided into m partial images, and is stored in a file. Therefore, one file stores m×n partial images. FIG. 16 shows an example of storing data in a file according to the third embodiment.

A file according to the present embodiment comprises a header unit 401 and a binary data unit 402. The binary data unit 402 stores n×m compressed partial image data Dxy obtained from n panoramic image data. Reference characters Dxy indicate that the current image is the y-th compressed partial image of the x-th panoramic image data. As in the first and second embodiments, m=6 indicates that an image is divided into six partial images. For example, the third compressed partial image y refers to an image having a field of view in the range from 120° to 180°.

The header unit 401 stores an address of a predetermined number of bytes (four bytes in this example) for access to each of the compressed partial image data of the binary data unit 402. The leading address of the compressed partial image data Dxy is represented by Axy. According to the present embodiment, an address is assigned by setting the leading address of the binary data unit 402 is set to 0 (that is, A11=0), and the relative address to the D11 of the leading compressed partial image data (D21, D31, . . . Dn1) of other panoramic images are set to A21 to An1 respectively. The starting address of the second or subsequent compressed partial image data of each panoramic image is represented by the relative address from the head of each panoramic image.

Therefore, when a file in the format shown in FIG. 16 is read to the memory, desired compressed partial image data can be extracted as follows. That is, assuming that the leading address in the memory of D11 is M11, the leading address Mxy of the desired compressed partial image data Dxy (the y-th data of the x-th panoramic image) is represented as follows.

$$Mxy = M11 + Ax1 + Axy \qquad (1)$$

If the memory is accessed using Mxy, then the compressed partial image data of Dxy can be obtained.

FIG. 17 is a flowchart of the procedure of generating and displaying the display image according to the third embodiment.

In step S201, the present position and the direction of a viewpoint are obtained. In step S202, it is determined whether or not the previously used file contains the panoramic image at the present position obtained in step S201. If it is not contained, then control is passed to step S203 to read a new file containing the present position, and then control is passed to step S204. To find which file contains the panoramic image at the current position, a file management table containing the position of a viewpoint associated with the file name is generated. On the other hand, if it is determined in step S202 that the previously used file contains the panoramic image at the present position, then control skips step S203, and is passed to step S204.

In step S204, necessary compressed partial image data is determined based on the present position, the present direction of a viewpoint, and the displayed field of view. According to the present embodiment, a panoramic image corresponding to the present position is determined at this point. Therefore, in the process in step S204, the necessary compressed partial image data Dxy in the panoramic image is determined by the present direction of the viewpoint and the display field of view.

In step S205, the leading address Mxy of the compressed partial image data (Dxy) determined in step S204 is obtained by the above mentioned equation (1). Then, in step S206, Mxy is accessed to decode the image data Dxy in the memory. As described above by referring to the first embodiment, when plural pieces of compressed partial image data are selected in step S204, all selected images are decoded (step S207). When necessary partial images are obtained, control is passed to step S208. If there are a plurality of partial images, they are combined together to generate a partial image including the image to be displayed and a necessary portion is cut out. In step S209, a projection converting process is performed to convert a panoramic image into an image plane, and the image converted in step S209 is displayed in step S210. When the walk-through process continues, the processes in steps S201 to S210 are repeated (step S211).

As described above, according to the third embodiment, one file stores a plurality of panoramic images. Therefore, the number of file accessing processes can be reduced, thereby raising the speed of the entire process. Furthermore, when a previously read file can be used, it is utilized (step S202). Therefore, the number of file accessing processes can be further reduced, thereby raising the speed of the processes. In the above mentioned processes, it is checked whether or not the previously read file can be used. However, it is not limited to the file used immediately before, but a file read some times before can also be used. For example, files read immediately before and two times before can be used. When used blocks are stored, it can be effectively used when the moving direction is inverted in the walk-through system.

[Fourth Embodiment]

According to the fourth embodiment of the present invention, a portion required to display an image is cut out from two partial images at a high speed.

Figure 18A:
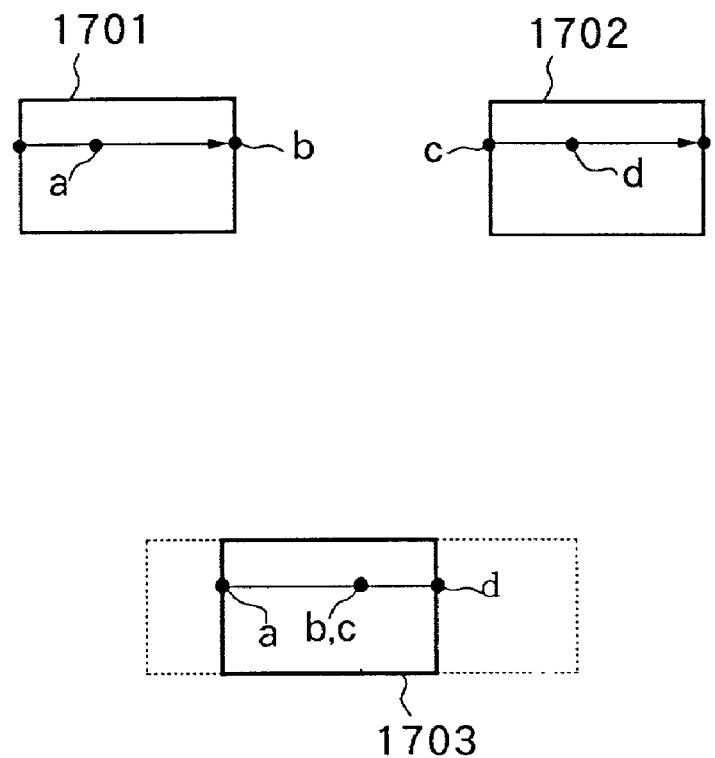
FIGS. 18A and 18B show the process of cutting out a portion to be displayed from two partial images.
Figure 18B:
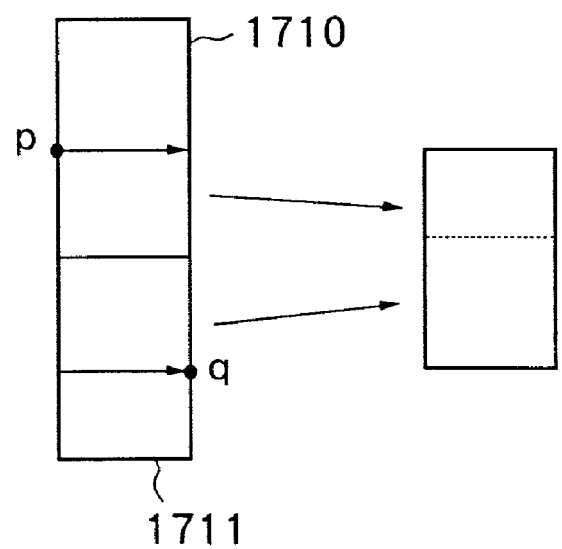

As described above, according to the first embodiment, a portion required to display an image is cut out by combining two partial images in steps S125 and S126. FIGS. 18A and 18B show the process of cutting out a display portion from the two partial images. In FIG. 18A, the two partial images 1701 and 1702 are decoded on the memory and combined together to provide a partial image 1703 having a wide field of view, and a portion required in reproduction is cut out therefrom. As shown in FIG. 18A, to obtain a desired display image from the first partial image 1701 and the second partial image 1702 obtained by decoding the two adjacent compressed partial image data, it is necessary to read a pixel b of the partial image 1701 from a pixel a, and then read a pixel d of the partial image 1702 from a pixel c, thereby generating the partial image 1703 obtained by combining these pixels in another memory area because there is discontinuity between the addresses of the pixel b and the pixel c.

Therefore, according to the fourth embodiment, a 90°-turned partial image is stored as compressed partial image data. In this case, when two pieces of partial image data 1710 and 1711 are drawn in the continuous pieces of memory space, necessary image data can be obtained only by specifying the addresses of a pixel p and a pixel q to be finally cut out as shown in FIG. 18B. Therefore, it is not necessary to develop an image by combining partial images in another memory area, thereby simplifying the entire process, that is, performing the process at a higher speed.

[Fifth Embodiment]

In the above mentioned walk-through system, various reproducing and displaying processes can be performed for higher-speed processes.

For example, since a viewpoint moves along the road on the map in the walk-through system, a file required next can be predicted if the road containing the present position of the viewpoint and the movement direction can be obtained. Therefore, while performing a reproducing and displaying process, a file required next can be read in advance, thereby raising the processing speed. However, it cannot be predicted in which way the viewpoint is directed. Therefore, a plurality of files such as a go-straight file, a left-turn file, a right-turn file, etc. are read in advance in a predetermined order.

If there is a portion not to be displayed depending on the moving speed in the walk-through system, the portion is not read in advance.

Figure 19:
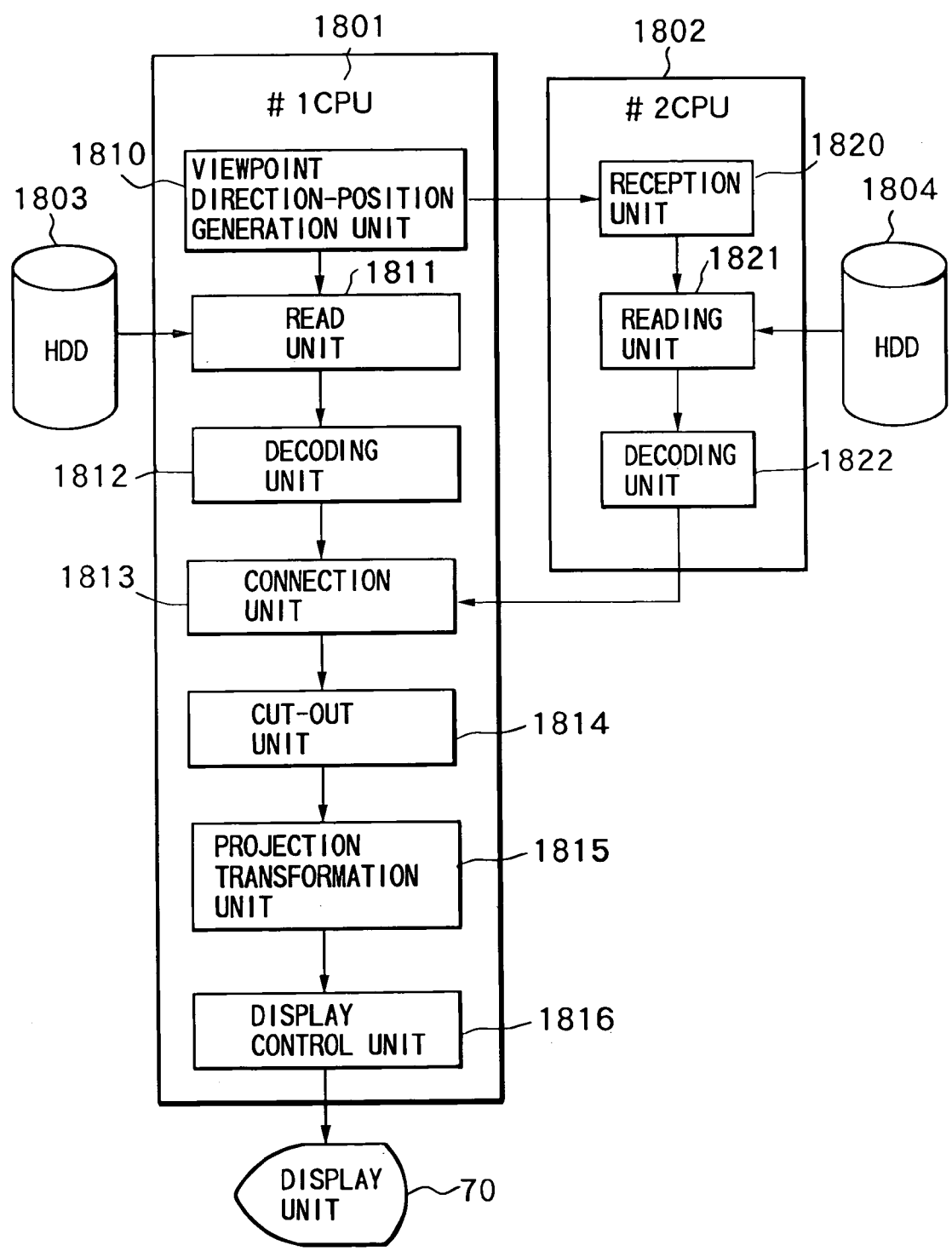
FIG. 19 shows the image reproducing process in a plurality of sub-processes.

Furthermore, the process of reading a plurality of files (compressed partial image data) can be easily performed at a higher speed by loading a plurality of CPUs and a plurality of hard disks. For example, when a file of the above mentioned compressed partial image data is mirrored to the plurality of hard disks, and the plurality of files are read and decoded, the process can be performed at a higher speed by reading and decoding the files by different CPUs. FIG. 19 shows the processes. Mirroring data to a plurality of hard disks can speed up the process when a CPU activates a plurality of processes (threads) as well as when a plurality of CPUs are loaded.

FIG. 19 shows a multiprocessor system having two processors of a #1 CPU 1801 and a #2 CPU 1802 to which hard disks 1803 and 1804 are connected respectively. The hard disks 1803 and 1804 store the same associated data. In this system, by executing a control program stored in the memory not shown in the attached drawings, the #1 CPU 1801 functions as a viewpoint direction-position generation unit 1810, a read unit 1811, a decoding unit 1812, an image connection unit 1813, a cut-out unit 1814, a projection transformation unit 1815, and a display control unit 1816. In addition, by executing the control program stored in the memory not shown in the attached drawings, the #2 CPU 1802 functions as a reception unit 1820, a reading unit 1821, and a decoding unit 1822.

When the operation is described by referring to FIG. 19, the viewpoint direction-position generation unit 1810 generates the information about the position and the direction of a viewpoint for an image to be reproduced and displayed depending on the input operation through a joy stick, etc., and transmits the information to the read unit 1811 and the 1820 for receiving the viewpoint direction-position information. The read unit 1811 reads the left partial image of the two partial images required to reproduce and display an image from the HDD 1803 based on the position and the direction of a viewpoint provided by the viewpoint direction-position generation unit 1810, and the decoding unit 1812 decodes the image.

On the other hand, the reading unit 1821 reads the right partial image of the two partial images required to reproduce and display an image from the HDD 1804 based on the position and the direction of a viewpoint provided by the viewpoint direction-position information reception unit 1820, and the decoding unit 1822 decodes the image.

The connection unit 1813 connects a partial image provided by the decoding units 1812 and 1822, and the cut-out unit 1814 cuts out a portion required to reproduce an image. On the image cut out by the cutout unit 1814, the projection transformation unit 1815 performs a projection converting process into an image plane, and the display control unit 1816 displays the conversion result on the display unit 70.

As described above, the process can be performed at a high speed by a plurality of processes respectively performed on a plurality of partial images.

The purpose of the present invention can also be attained by providing a system or a device with a storage medium (or a record medium) storing a program code of the software for realizing the functions of the above mentioned embodiments, and by the computer (or the CPU and the MPU) of the system or the device reading the program code stored in the storage medium. In this case, the program code itself read from the storage medium realizes the functions of the above mentioned embodiments, and the storage medium storing the program code configures the present invention. In addition, the functions of the above mentioned embodiments can be realized not only by executing the program code read by the computer, but also by the operating system (OS), etc. operating in the computer at an instruction of the program code actually performing a part or all of the actual process.

Furthermore, the functions of the above mentioned embodiments can also be realized by reading a program code read from a storage medium to the memory provided in a function extension card inserted in a computer or a function extension unit connected to the computer, and by performing a part or all of the actual processes by the CPU, etc. in the function extension card and the function extension unit at an instruction of the program code.

As described above, according to the present invention, when virtual space is designed in a walk-through system using the IBR technology, stored image information can be efficiently reproduced, thereby improving real-time reproducibility.

As many apparently widely different embodiments of the present invention can be made without departing from the spirit and scope thereof, it is to be understood that the invention is not limited to the specific embodiments thereof except as defined in the claims.

What is claimed is:

1. An image reproduction apparatus, comprising:
    a storage unit configured to store a plurality of compressed partial images obtained by dividing a panoramic image by a predetermined angular field of view for each of a plurality of panoramic images, each panoramic image corresponding to a different viewpoint;
    a selection unit configured to select compressed partial images stored in said storage unit based on information about a position and a direction of a viewpoint;
    a decompression unit configured to decompress the compressed partial images selected by said selection unit;
    a drawing unit configured to rotate each of the decompressed partial images by 90° and draw the rotated partial images in a successive memory space; and
    an extraction unit configured to extract an output image corresponding to the position and the direction of a viewpoint from the memory space where the partial images have been drawn, based on a start pixel address and an end pixel address of the output image.

2. An image reproducing method, comprising the steps of:
    storing in a storage unit a plurality of compressed partial images obtained by dividing a panoramic image by a predetermined angular field of view for each of a plurality of panoramic images, each panoramic image corresponding to a different viewpoint;
    selecting compressed partial images stored in said storage unit based on information about a position and a direction of a viewpoint;
    decompressing the compressed partial images selected in said selecting step;
    rotating each of the decompressed partial images by 90°, drawing the rotated partial images in a successive memory space; and
    extracting an output image corresponding to the position and the direction of a viewpoint from the memory space where the partial images have been drawn, based on a start pixel address and an end pixel address of the output image.

3. A computer-executable program stored in a computer readable medium for effecting the method of claim 2.

4. A storage medium storing the computer-executable program of claim 3.

* * * * *

UNITED STATES PATENT AND TRADEMARK OFFICE
CERTIFICATE OF CORRECTION

PATENT NO. : 7,103,232 B2  
APPLICATION NO. : 09/818627  
DATED : September 5, 2006  
INVENTOR(S) : Daisuke Kotake et al.

Page 1 of 1

It is certified that error appears in the above-identified patent and that said Letters Patent is hereby corrected as shown below:

ON THE TITLE PAGE, AT PAGE (56):
Foreign Patent Documents, insert --JP 11-168754 6/1999--.

COLUMN 1:
Line 14, "Technology of" should read --Technology for--.
Line 17, "image data" should read --image data, is known--.
Line 50, "system" should read --system is employed--.

COLUMN 4:
Line 30, "after associated" should read --after being associated--.
Line 60, "associates with" should read --associates said--.

COLUMN 9:
Line 64, "According the" should read --According to the--.

COLUMN 10:
Line 39, "better reduce" should read --better to reduce--.

Signed and Sealed this

First Day of May, 2007

JON W. DUDAS  
*Director of the United States Patent and Trademark Office*